United States Patent [19]
Paramonoff et al.

[11] 3,825,270
[45] July 23, 1974

[54] WIPER SEAL FOR APPARATUS SUCH AS METALLIC CAN BODY FORMERS

[75] Inventors: Elpidifor Paramonoff, Los Angeles; Frederick C. Olsen, Huntington Beach; Robert C. Labeda, Buena Park, all of Calif.

[73] Assignee: Standum, Inc., Compton, Calif.

[22] Filed: May 9, 1972

[21] Appl. No.: 251,802

[52] U.S. Cl.............................. 277/15, 277/59, 277/71
[51] Int. Cl............................. F16j 15/32, F16j 15/40
[58] Field of Search............ 277/24, 58, 59, 70, 71, 277/72, 15, 16

[56] References Cited
UNITED STATES PATENTS
| | | | |
|---|---|---|---|
| 2,131,927 | 10/1938 | Wenzel | 277/59 |
| 2,486,939 | 11/1949 | Freund | 277/71 |
| 2,928,685 | 3/1960 | Tracy | 277/74 |

FOREIGN PATENTS OR APPLICATIONS
| | | | |
|---|---|---|---|
| 858,261 | 7/1949 | Germany | 277/59 |

*Primary Examiner*—Louis R. Prince
*Assistant Examiner*—Robert I. Smith
*Attorney, Agent, or Firm*—Mahoney, Schick & Cislo

[57] ABSTRACT

The ram of a can body former has a bearing oil flowing thereon at one side of a wiper seal and metal forming liquid at the opposite side thereof. The wiper seal includes an outer housing portion mounting an inner housing ring axially slideably removable therefrom with sealing means therebetween. The inner housing ring, in turn, mounts a manifold ring forming a manifold chamber surrounding the ram with single or multiple sealing rings at opposite sides of the manifold ring slideably engaging the ram. A pressure fluid inlet into the manifold chamber maintains a fluid pressure therein and a fluid bleed-off from the manifold chamber constantly bleeds off a portion of the pressure fluid having mixed therein quantities of the bearing oil and forming liquid bypassing the seals during ram reciprocal movement. The mounting of the manifold ring and sealing rings within the inner housing ring permits the entire assembly to be axially slideably removed as a unit from the outer housing portion.

8 Claims, 7 Drawing Figures

WIPER SEAL FOR APPARATUS SUCH AS METALLIC CAN BODY FORMERS

BACKGROUND OF THE INVENTION

This invention relates to an improved wiper seal for apparatus such as metallic can body formers and the like wherein an axially moving shaft or ram has two different lubricating liquids flowing thereover at spaced axial portions thereof during ram reciprocal movement and it is necessary to maintain the lubricating liquids separated during this ram movement. The improved wiper seal of the present invention insures maximum lubricating liquid separation through the formation of a manifold between ram engaging sealing rings, which manifold contains constantly pressurized fluid therein for receiving the small quantities of the various lubricating liquids bypassing the seals. The manifold pressurized fluid is constantly bled off while still maintaining pressure within the manifold to thereby constantly remove the mixture of manifold fluid and the seal bypassing lubricating liquids.

In apparatus, such as metallic can body formers, where a reciprocal, axially moving ram is required for performing various metal drawing and wall ironing operations, two lubricating liquids are necessarily involved, both of which come into contact with the reciprocally moving ram at spaced axial locations thereon. The ram must, of course, somehow be mounted through bearing means for its reciprocal movement and this necessarily dictates some form of bearing oil. At the same time, at the working end portion of the ram which actually performs the metal forming operations, a metal forming and die lubricating liquid is involved and necessary in order that the metal forming operations will be properly carried out.

With both of these lubricating liquids constantly contacting the reciprocally moving ram, a distinct problem of liquid mixing or bearing oil and metal forming liquid mixing, is presented. Such problem, of course, could be solved merely by permitting the liquids to mix and then disposing of the mixture. Considering, however, that in metallic can body formers the ram is reciprocally moving at the rate of 125-175 cycles per minute and a constant flow of both bearing oil and metal forming liquid is required, it is apparent that the foregoing simple solution to the problem is completely prohibitive from both the cost and supply standpoint.

Thus, from the practical standpoint, it is absolutely dictated that the bearing oil on the one hand and the metal forming liquid on the other hand must be arranged on a constantly recirculating basis so that these lubricating liquids may be constantly reused. The only feasible solution to the problem, therefore, is to somehow maintain a strict separation between the two liquids, despite the fact that the ram tends to carry one to the other on an extremely high speed, repeated basis. For these reasons various forms of wiper seals have heretofore been provided in an attempt to accomplish the necessary separation, none of which have been completely satisfactory and all of which have still resulted in distinct contamination problems, one liquid into the other.

For instance, with the prior wiper seals provided, both single and multiple resilient sealing rings have been installed at a location between the two liquid flows onto the ram. In every case, however, even with the most efficient sealing rings and using various combinations thereof, there still is a certain amount of the two liquids which will bypass the sealing rings and cause intermixing between the two liquid flows. Even though the quantities of intermixing liquids may be relatively small for one reciprocal stroke of the ram, when it is kept in mind that the ram is moving at the high speeds and the great number of repeated movements or cycles as hereinbefore pointed out, considerable intermixing into the various liquid flows can take place in a relatively short period of time.

OBJECTS AND SUMMARY OF THE INVENTION

It is, therefore, an object of this invention to provide an improved wiper seal for apparatus such as metallic can body formers and the like wherein not only is an improved separation provided between the two liquids carried by the ram, but the unavoidable small quantities of the liquids that are intermixed through the ram movement are removed from each of the two liquid flow systems so that intermixing of the liquids is maintained at a bare minimum. According to the present invention, a multiple sealing ring system is used, part preventing the passage of one liquid to maintain it in its own constantly circulating supply system and part preventing passage of the other liquid to likewise maintain it in its own constantly circulating supply system. Even with the high efficiency of this sealing ring system, however, small quantities of each of the liquids will bypass their respective sealing rings and these are collected intermediate the sealing ring assembly and constantly removed so as not to re-enter either of the liquid systems.

It is a further object of this invention to provide an improved wiper seal for apparatus such as metallic can body formers and the like which accomplishes the foregoing intermixed liquid removal by providing a constantly pressurized manifold chamber between the respective parts of the sealing ring assembly which collects the small quantities of the liquids passing the sealing ring barriers and by constantly bleeding off a portion of the pressurized fluid in the manifold chamber, it is possible to remove the small quantities of intermixed liquids to completely eliminate the same from either of the liquids circulating systems. In this manner, contamination of one liquid into the other is maintained at an extremely bare minimum so that the liquids are useable on a constantly recirculating basis for a long period of time without the requirement that they be repeatedly changed.

It is also an object of this invention to provide an improved wiper seal for apparatus such as metallic can body formers and the like having all of the foregoing attributes, yet which is formed in an assembly which is easily and conveniently removable from its assembled location for frequency servicing to maintain the operation thereof at top efficiency. In the preferred embodiments of the present invention shown in the drawings and hereinafter described, various of manifold and sealing rings are mounted in an inner housing ring which is sealed with outer portions of the housing and axially slideable from the outer housing portions merely by the removal of a positioning plate. Thus, all of the manifold and sealing rings are removable with the inner housing ring as a unit so that frequent servicing operations may be performed and the wiper seal may be maintained operating at peak efficiency.

DESCRIPTION OF THE BEST EMBODIMENTS CONTEMPLATED

Figure 1:
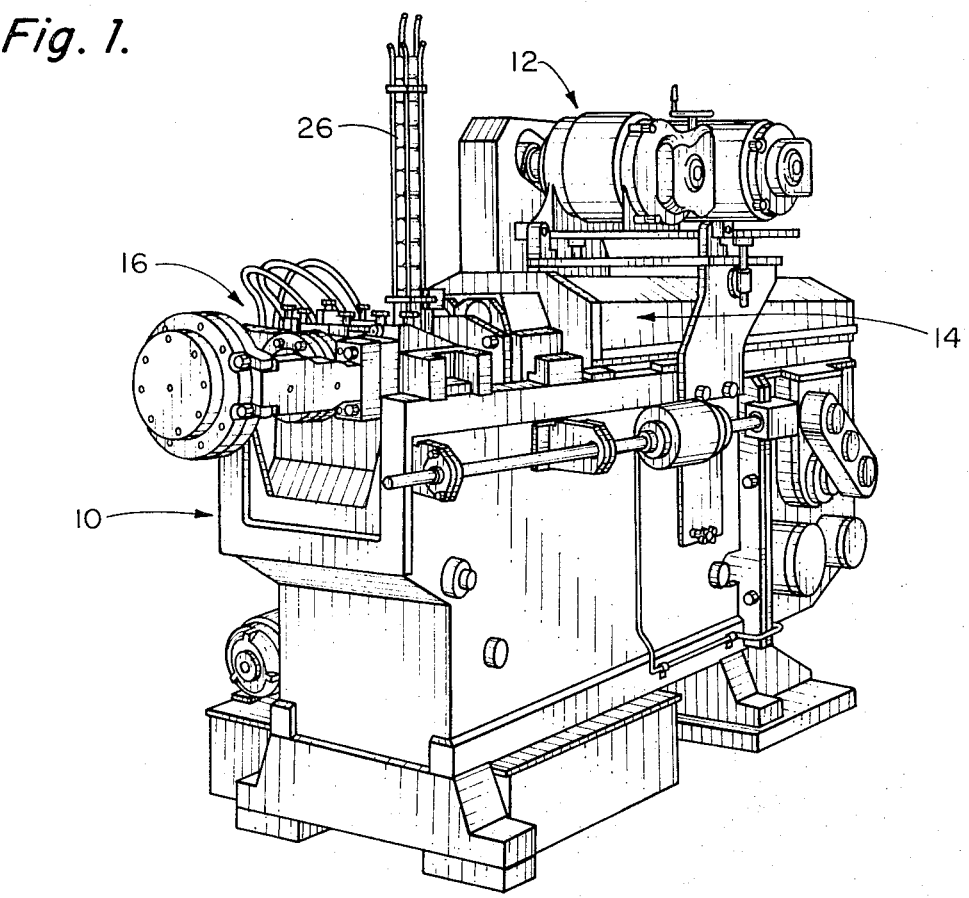
FIG. 1 is a side perspective view of a typical metallic can body former having a reciprocal ram and incorporating either of two preferred embodiments of the improved wiper seal of the present invention.
Figure 2:
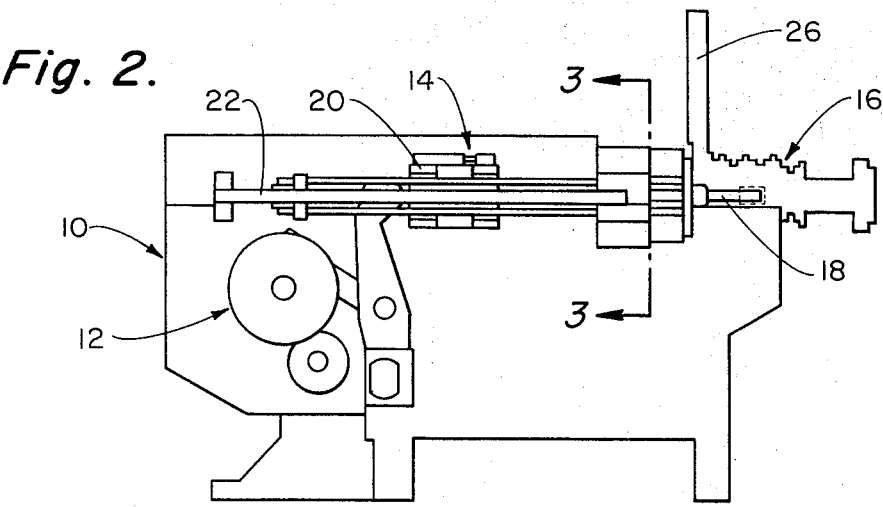
FIG. 2 is a side elevational, somewhat diagramatic view of the metallic can body former of FIG. 1 and showing various of the working parts thereof.
Figure 3:
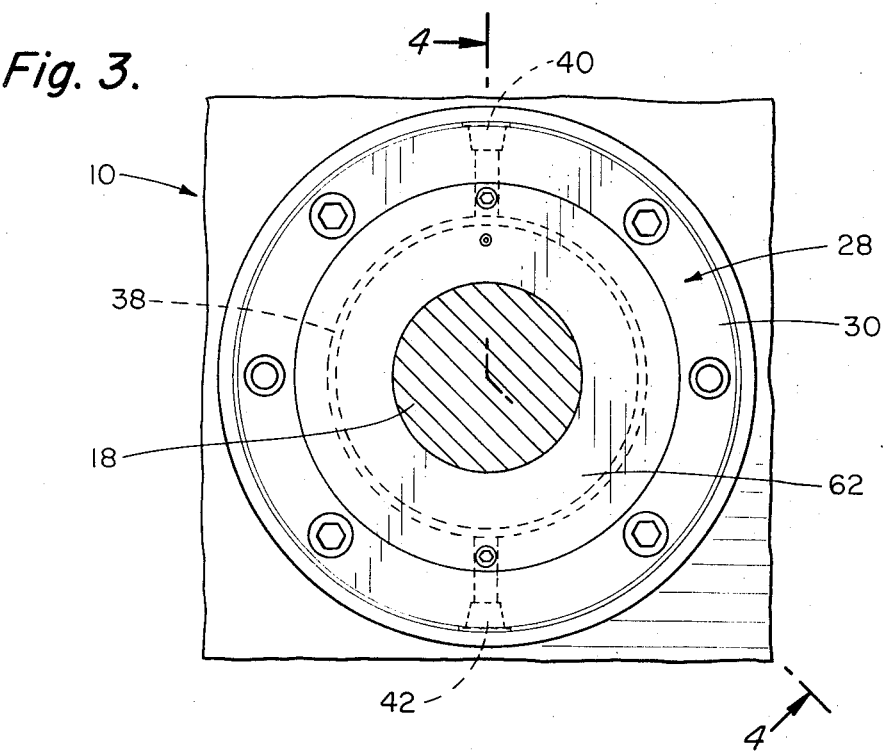
FIG. 3 is an enlarged fragmentary, rearward end view of a first embodiment of the improved wiper seal of the present invention looking in the direction of the arrows 3—3 in FIG. 2 and showing the ram in vertical section.

Referring for the moment to FIGS. 1 and 2 for generally outlining a typical background environment for the embodiments of the improved wiper seal of the present invention, a metallic can body former is shown and includes a main frame generally indicated at 10 mounting a ram drive assembly generally indicated at 12, a ram bearing support assembly generally indicated at 14 and a diepack generally indicated at 16. A cylindrical ram 18 is supported on the main frame 10 by the ram bearing support assembly 14 for axial reciprocal movement in rearward working and forward return strokes at a speed rate in the order of 125–175 cycles per minute. The ram bearing support assembly 14 may include main oil bearings 20 slideable reciprocally on a pressured film of bearing oil over slides 22 and forwardly of the main oil bearings, an intermediate portion of the ram 18 may be directly supported on a pressurized film of bearing oil by an oil bearing sleeve 24 (FIG. 4).

The ram 18 is rearwardly and forwardly driven by the ram drive assembly 12 from a forward position fully forward of a cup-shaped article part feed 26 rearwardly through the diepack 16 and then forwardly returned to its starting position. Thus, a cup-shaped article is engaged by the ram 18 at the part feed 26 and carried rearwardly through the diepack 16 for performing certain metal working operations on the cup-shaped article to reform the same into a finally formed article. Furthermore, metal forming liquid flows over the cup-shaped article, the ram 18 and various dies within the diepack 16 during this metal forming operation, the metal forming liquid serving the dual purpose of both lubricating and cooling for properly carrying out the various required operations.

Both the bearing oil in the bearing support assembly 14 and metal forming liquid in the diepack 16 are constantly flowing through respective circulating systems and with the ram 18 travelling in the reciprocal movements, not only are various portions of the ram bathed by the respective oil and liquid during each reciprocal movement, but portions of the ram receiving the bearing oil must travel from the rearward termination of the bearing support assembly 14 into the diepack 16, where the same ram portions are bathed by the metal forming liquid. In reverse return movement of the ram, the opposite occurs. It is evident, therefore, that unless the ram is wiped of the oil and liquid intermediate the bearing support assembly 14 and the diepack 16, the oil and liquid will be intermixed in appreciable quantities and that is the purpose of the improved wiper seal of the present invention.

Figure 4:
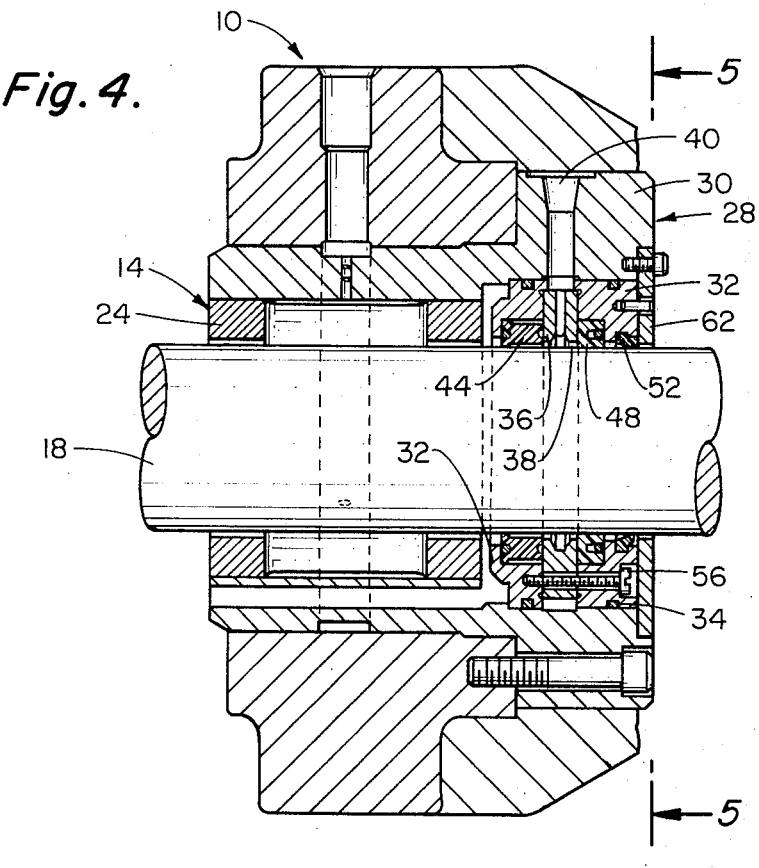
FIG. 4 is an enlarged, fragmentary, vertical sectional view taken axially through the first embodiment of the wiper seal and an adjacent ram oil bearing, looking in the direction of the arrows 4—4 in FIG. 3.
Figure 5:
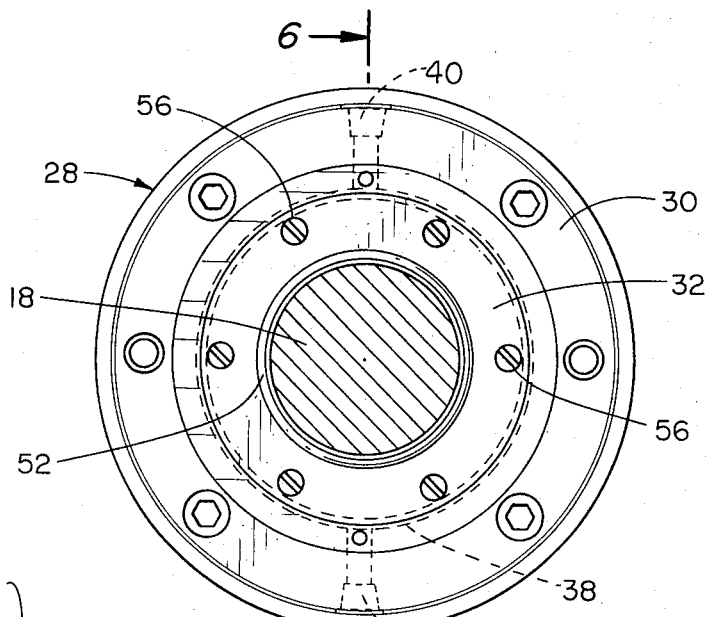
FIG. 5 is a view similar to FIG. 3, but with a rear positioning plate of the first embodiment of the wiper seal removed.

Referring to FIGS. 3 through 6, a first embodiment of the wiper seal of the present invention is generally indicated at 28 mounted by the main frame 10 just rearwardly of the rearward termination of the bearing support assembly 14 as formed by the oil bearing sleeve 24. The wiper seal 28 includes an outer housing portion 30 which also preferably forms a housing for the oil bearing sleeve 24 and is axially removably secured to the main frame 10 as best seen in FIG. 4. The outer housing portion 30, in turn, axially telescopes an axially separated, two-part inner housing ring 32, the outer housing portion and the inner housing ring joining at cylindrical surfaces and having sealing rings 34 therebetween.

Figure 6:
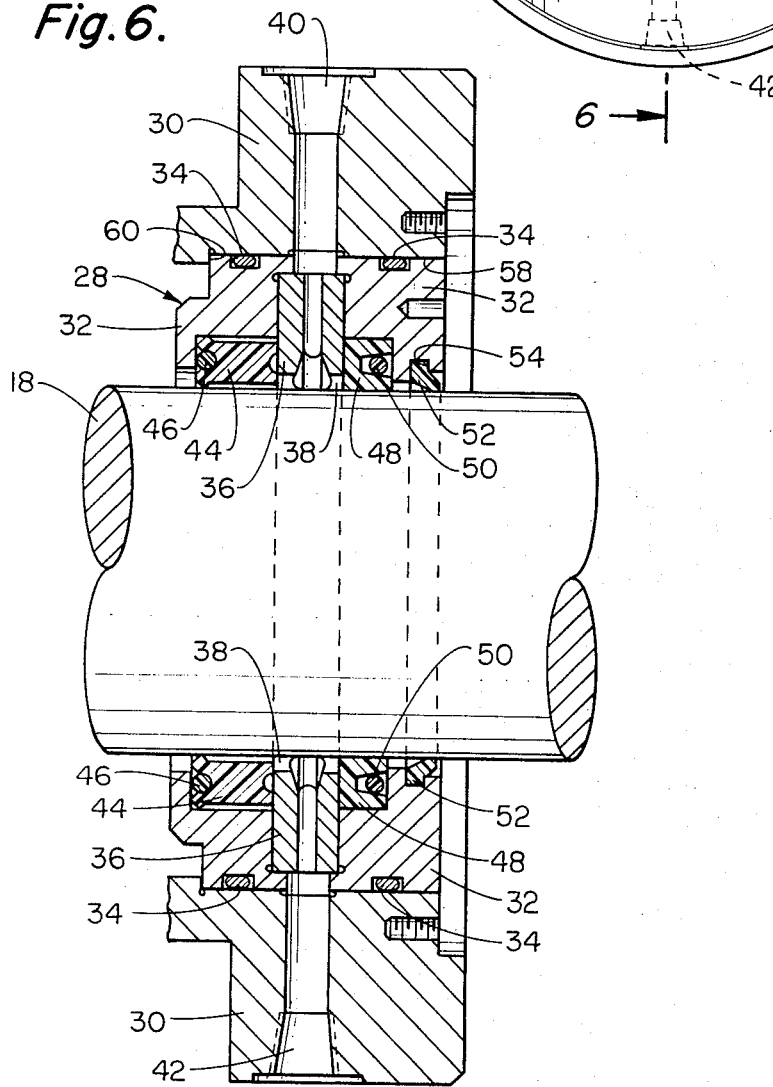
FIG. 6 is an enlarged, fragmentary, vertical sectional view through the first embodiment of the wiper seal, looking in the direction of the arrows 6—6 in FIG. 5.

As best seen in FIG. 6, the two parts of the inner housing ring 32 partially axially telescope as well as axially clamp therebetween, a manifold ring 36 which terminates inwardly spaced outwardly from the ram 18 to form a cylindrical manifold chamber 38 completely around the ram. A pressure fluid inlet 40 is formed downwardly through the outer housing portion 30 between the two parts of the inner housing ring 32 and downwardly through the manifold ring 36 to communicate downwardly into the manifold chamber 38. A similar fluid bleed-off outlet 42 is formed downwardly through the manifold ring 36 from the manifold chamber 38, between the two parts of the inner housing ring 32 and downwardly through the outer housing portion 30 so as to communicate downwardly from the manifold chamber.

A first or forward, blade-type, resilient sealing ring 44 is likewise axially telescoped by the inner housing ring 32 urged radially inwardly against the ram 18 and radially outwardly against the inner housing ring by a usual pressure ring 46 and the sealing ring contained resilience, this ring axially forwardly abutting the inner housing ring and rearwardly the manifold ring 36. A second or rearward, surface-type, resilient sealing ring 48 is similarly positioned rearwardly of the manifold ring 36 in axial abutment with the manifold ring and the inner housing ring 32 urged radially by a usual pressure ring 50 and the sealing ring contained resilience. The sealing ring assembly is completed by an auxiliary blade-type, resilient sealing ring 52 received in an annular recess 54, spaced rearwardly of the second sealing ring 48 and bearing resiliently inwardly and rearwardly against the ram 18.

The two parts of the inner housing ring 32 are retained axially together clamping and positioning the manifold ring 32 and the various sealing rings by a series of axially extending fasteners 56 (FIG. 4). Furthermore, this assembly of the inner housing ring 32, the manifold ring 36 and the sealing rings 44, 48 and 52, are axially forwardly slid into the telescoped assembly with the outer housing portion 30 through a rearward opening 58 and forwardly against a shoulder 60, being retained in place by a fastener secured, annular positioning plate 62 shown installed in FIGS. 3 and 4 and removed in FIGS. 5 and 6. Thus, merely with the removal of the positioning plate 62, the basic working parts of the wiper seal 28 may be conveniently removed and disassembled for proper servicing normally required from time to time in seal assemblies of the type herein involved.

In operation of the wiper seal 28 of the present invention, with the ram 18 moving axially in its highspeed reciprocations as previously described, bearing oil from the main oil bearings 20 and particularly the immediately forwardly adjacent oil bearing sleeve 24 will be carried rearwardly with the ram to the first or forward sealing ring 44 where the major portion thereof will be wiped from the ram surface, but minute portions thereof will pass by the first or forward sealing ring 44 being deposited at the manifold chamber 38. At the same time, metal forming liquid will be carried forwardly by the ram 18 with the major portions thereof being wiped from the ram by the combination of the auxiliary sealing ring 52 and the second or rearward sealing ring 48, but again minute portions thereof will be carried forwardly to likewise be deposited in the manifold chamber 38 and intermixed with the bearing oil. While this deposit of the minute portions of the bearing oil and metal forming liquid is taking place within the manifold chamber 38 during movement of the ram 18, the pressure of pressurized fluid from the pressure fluid inlet 40 is constantly maintained within the manifold chamber 38 and a portion thereof is constantly being bled off from the manifold chamber through the fluid bleed-off outlet 42 so that the deposits of the intermixed bearing oil and metal forming liquid within the manifold chamber are constantly bled off or removed to permit continuation of the separation function between the main bearing oil and metal forming liquid supplies by the wiper seal.

In construction of the first embodiment of the wiper seal 28 of the present invention, the various sealing rings 44, 48 and 52, may be of usual resilient materials, such as plastic, but must be compatible with the bearing oil and metal forming liquid involved. The pressurized fluid within the manifold chamber 38 may be virtually any controllable gas or liquid, air being found to be satisfactory in the particular application shown and being used under a pressure of approximately 5 to 10 lbs. per square inch which will give only a slight static pressure load in opposite axial directions against the sealing rings so as to only slightly aid them in their wiping and sealing functions merely through slight axial crowding thereof within the inner housing ring 32. Furthermore, the air pressure within the manifold chamber 38, with the sealing ring assembly of the first embodiment, must be maintained at the relatively low 5 to 10 lbs. per square inch pressure to prevent blow-by of the air between the ram 18 and the sealing rings 44, 48 and 52 which will destroy their sealing function. The controlled bleed-off of the pressurized fluid for eliminating the deposited minute portions of the bearing oil and metal forming liquid may be controlled through a usual needle valve arrangement (not shown) or by the determined formation of the size of the fluid bleed-off outlet 42, all well known to those skilled in the art.

Figure 7:
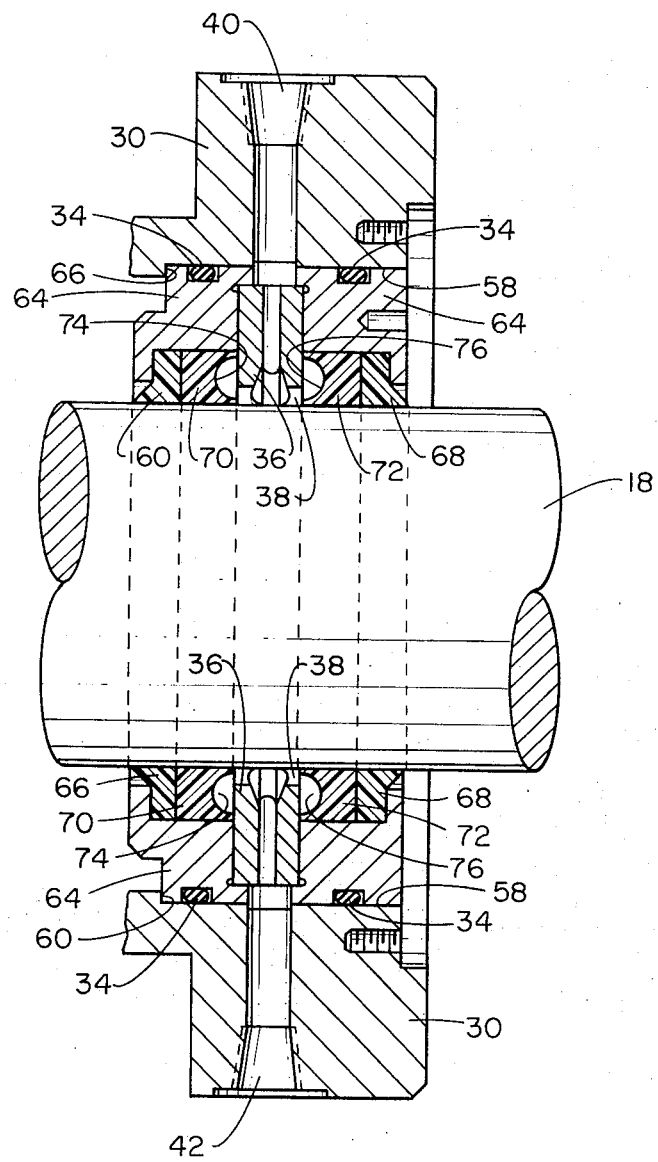
FIG. 7 is a view similar to FIG. 6, but showing a second embodiment of the wiper seal.

Referring to FIG. 7 of the drawings, a second embodiment of the improved wiper seal of the present invention is shown, and in most respects is virtually the same as the first embodiment thereof just described including the same outer housing portion 30 axially slidably receiving and mounting a similar, two-part inner housing ring 64, which in turn mounts the manifold ring 36 forming the manifold chamber 38 and having the pressure fluid inlet 40 communicating inwardly with the manifold chamber and the fluid bleed-off outlet 42 communicating outwardly from the manifold chamber. The only true differences between this second embodiment from the first embodiment is a slight alteration in the inner housing ring 64 from the previous inner housing ring 32 to accommodate different forms of sealing rings, and the use of a markedly higher fluid pressure within the manifold chamber to not only provide the inter-mixed liquid collection and bleed-off for disposal thereof, but also to aid in the sealing functions of the sealing rings against the surface of the moving ram 18. In this second embodiment, the inner housing ring 64 receives and positions a first or forward, somewhat passive pressure, outer sealing ring 66, a similar second or rearward, somewhat passive pressure, outer sealing ring 68, a first or forward, active pressure, inner sealing ring 70 and a similar second or rearward, active pressure, inner sealing ring 72.

As shown, the first or forward and second or rearward outer sealing rings 66 and 68 have forwardly and rearwardly facing angled surfaces, respectively, so as to serve wiping and sealing functions, while the first or forward and second or rearward inner sealing rings 70 and 72 have expansion recesses 74 and 76, respectively, facing the manifold ring 36 and opening partially into the manifold chamber 38. The fluid pressure within the manifold chamber 38 with this embodiment is preferably maintained relatively high, preferably in the order of 40 lbs. per square inch with the same slight bleed-off through the fluid bleed-off outlet 42 to continuously dispose of the inter-mixed bearing oil and metal forming liquid collecting within the manifold chamber. Thus, with the outer and inner sealing rings 66, 68, 70 and 72 formed of the usual resilient materials as in the first embodiment, the contained fluid pressure within the manifold chamber 38 acts oppositely axially against the inner sealing rings 70 and 72 within the expansion recesses 74 and 76 thereof to radially expand these inner sealing rings and force a tighter sealing against the outer surface of the axially moving ram 18. At the same time, this contained fluid pressure within the manifold chamber 38 will exert axial forces against the inner sealing rings 70 and 72, a portion of which will be transferred to the outer sealing rings 66 and 68 so that, due to the radial confinement of these sealing rings by the inner housing ring 64, these sealing rings will be forced to expand somewhat radially inwardly due to the resiliency thereof, again greatly aiding in both the sealing and wiping functions against the outer surface of the moving ram 18.

Thus, according to the principles of the present invention, an improved wiper seal for apparatus such as metallic can body formers is provided by both embodiments illustrated wherein not only is an efficient separation maintained between liquids, such as bearing oil and metal forming liquid constantly flowing over spaced portions of a reciprocally moving shaft, such as the ram 18, but minute quantities of the liquids bypassing the seals are collected and bled off on a continuing basis so that any intermixing does not return to the major supplies of the liquids. Furthermore, the wiper seal construction of the present invention is conveniently formed for disassembly of the major working portions thereof subject to deterioration through continued use of the wiper seal so that in a convenient disassembly operation, the wiper seal may be serviced with following reassembly placing the wiper seal in optimum operation form. Still further, both embodiments of the wiper seal construction illustrated provide efficient wiping and sealing functions against the surface of the axially moving ram 18 of the bearing oil and metal forming liquid, as well as the collection and elimination of the intermixed small quantities thereof, the first embodiment form depending primarily on mere resilient pressure of the contained sealing rings 44, 48 and 52 with little assistance from the contained low fluid pressure within the manifold chamber 38, while the second embodiment form makes direct and vital use of a relatively high contained fluid pressure within the manifold chamber 38 in the wiping and sealing functions of the sealing rings 66, 68, 70 and 72.

I claim:

1. In a wiper seal construction of the type for maintaining separation between first and second liquids at spaced portions of a reciprocally axially moving shaft, such as two lubricants of a can body former ram; the combination: a reciprocally movable shaft; a wiper seal housing radially surrounding a path of reciprocal movement of said shaft; a first liquid constantly supplied on said shaft at one axial side of said housing and a second liquid constantly supplied on said shaft at an opposite axial side of said housing; said housing having an annular manifold therein spaced radially from said shaft forming an annular manifold chamber generally surrounding said shaft and opening radially inwardly against said shaft; first and second resilient sealing rings in said housing axially slidably engaging said shaft at axially opposite sides of said manifold chamber axially at least partially exposed to said manifold chamber and sealing off a major portion of said first and second liquids from said manifold chamber during said shaft movements; fluid inlet means through said manifold for constantly supplying pressurized fluid to and filling said manifold chamber radially inwardly against said shaft and oppositely axially against said sealing rings; and fluid bleedoff means through said manifold for constantly bleeding off at least a portion of said pressurized fluid from said manifold chamber mixed with quantities of said first and second liquids axially passing said first and second sealing rings, while still maintaining said pressure on said pressurized fluid in said chamber and oppositely axially against said sealing rings.

2. A wiper seal construction as defined in claim 1 in which said manifold is a ring in said housing maintained by said housing spaced radially from said shaft and forming said manifold chamber about said shaft opening radially inwardly against said shaft and oppositely axially communicating with said first and second sealing rings.

3. A wiper seal construction as defined in claim 1 in which said sealing rings are positioned in said housing directly axially adjacent said manifold at opposite sides of said manifold chamber at least partially axially exposed to said manifold chamber radially inwardly of said manifold.

4. A wiper seal construction as defined in claim 1 in which said manifold is a ring in said housing maintained spaced radially from said shaft and forming said annular manifold chamber about said shaft opening radially inwardly against said shaft; and in which said first and second sealing rings are in said housing directly axially adjacent and abutting said manifold ring at opposite sides of said manifold chamber at least partially axially exposed to said manifold chamber radially inwardly of said manifold.

5. A wiper seal construction as defined in claim 1 in which each of said first and second resilient sealing rings has a recess opening axially toward said manifold chamber in at least partial communication with said manifold chamber radially inwardly of said manifold and subject to said pressurized fluid in said chamber, said pressurized fluid in said manifold chamber exerting both axial and radial forces in said recesses against said sealing rings.

6. A wiper seal construction as defined in claim 1 in which a third resilient sealing ring is in said housing axially abutting said first resilient sealing ring and axially slidably engaging said shaft at an opposite side of said first resilient sealing ring from said manifold chamber; in which a fourth resilient sealing ring is in said housing axially abutting said second resilient sealing ring and axially slidably engaging said shaft at an opposite side of said second resilient sealing ring from said manifold chamber; and in which each of said first and second resilient sealing rings has a recess opening axially toward said manifold chamber in at least partial communication with said manifold chamber radially inwardly of said manifold and subject to said pressurized fluid in said chamber, said pressurized fluid in said manifold chamber exerting both axial and radial forces in said recesses against said first and second sealing rings and therethrough axially against said third and fourth sealing rings.

7. A wiper seal construction as defined in claim 1 in which said manifold is a ring in said housing maintained by said housing spaced radially from said shaft and forming said manifold chamber about said shaft opening radially inwardly against said shaft; in which said first and second resilient sealing rings are in said housing directly axially adjacent and abutting said manifold ring at opposite sides of said manifold chamber at least partially axially exposed to said manifold chamber radially inwardly of said manifold; in which said housing has portions thereof axially confining said first and second sealing rings at sides of said sealing rings opposite from said manifold ring and manifold chamber; and in which each of said first and second sealing rings has a recess opening axially toward said manifold chamber partially in direct communication with said manifold chamber radially inwardly of said manifold and subject to said pressurized fluid in said chamber, said pressurized fluid exerting both axial and radial forces in said recesses against said first and second sealing rings.

8. A wiper seal construction as defined in claim 1 in which said manifold is a ring in said housing maintained by said housing spaced radially from said shaft and forming said manifold chamber about said shaft opening radially inwardly against said shaft; in which said first and second sealing rings are in said housing axially adjacent and abutting said manifold ring at opposite sides of said manifold chamber at least partially axially exposed to said manifold chamber radially inwardly of said manifold; in which a third resilient sealing ring is in said housing axially slidably engaging said shaft abutting said first sealing ring at an opposite side of said first sealing ring from said manifold ring; in which a fourth resilient sealing ring is in said housing axially slidably engaging said shaft abutting said second sealing ring at an opposite side of said second sealing ring from said manifold ring; in which said third and fourth sealing rings are axially confined outwardly of said first and second sealing rings by said housing; and in which each of said first and second sealing rings has a recess opening axially toward said manifold chamber in partial direct communication with said manifold chamber radially inwardly of said manifold and subject to said pressurized fluid in said chamber, said pressurized fluid exerting both axial and radial forces in said recesses against said first and second sealing rings and therethrough axially against said third and fourth sealing rings.

* * * * *

UNITED STATES PATENT OFFICE
CERTIFICATE OF CORRECTION

Patent No. 3,825,270　　　　　　　　　　Dated　July 23, 1974

Inventor(s) ELPIDIFOR PARAMONOFF, FREDERICK C. OLSEN, ROBERT C. LABEDA

It is certified that error appears in the above-identified patent and that said Letters Patent are hereby corrected as shown below:

--Assignee: Standun, Inc., Compton, Calif.--

Signed and sealed this 12th day of November 1974.

(SEAL)
Attest:

McCOY M. GIBSON JR.　　　　　　　　　C. MARSHALL DANN
Attesting Officer　　　　　　　　　　Commissioner of Patents